Oct. 14, 1969    P. KORTENHOVEN    3,472,064
APPARATUS FOR ULTRASONICALLY TESTING TUBES
Filed May 29, 1967    3 Sheets-Sheet 3
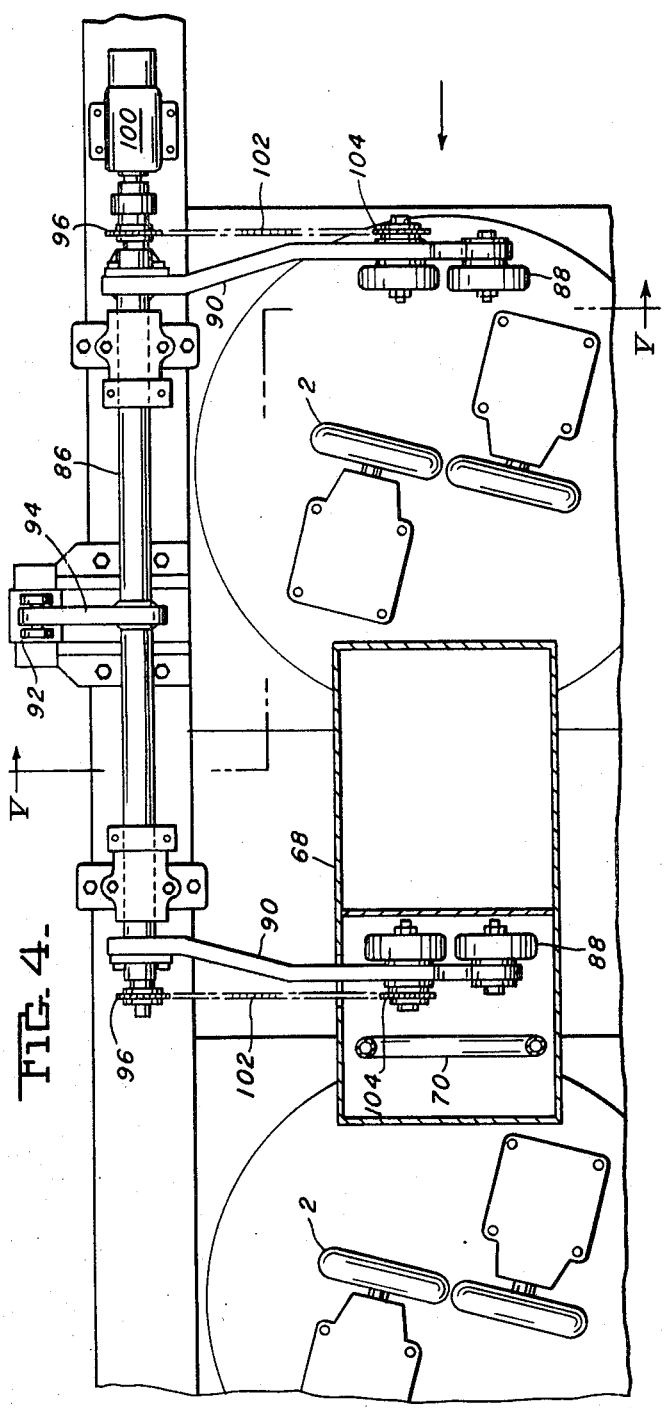
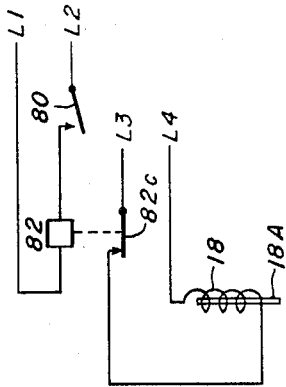
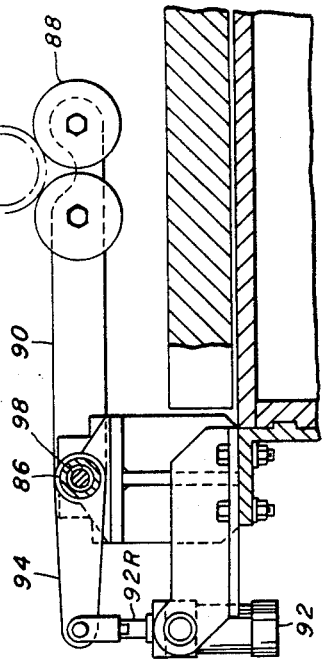
INVENTOR.
PETER KORTENHOVEN
By Donald G. Dalton
Attorney

United States Patent Office 3,472,064
Patented Oct. 14, 1969

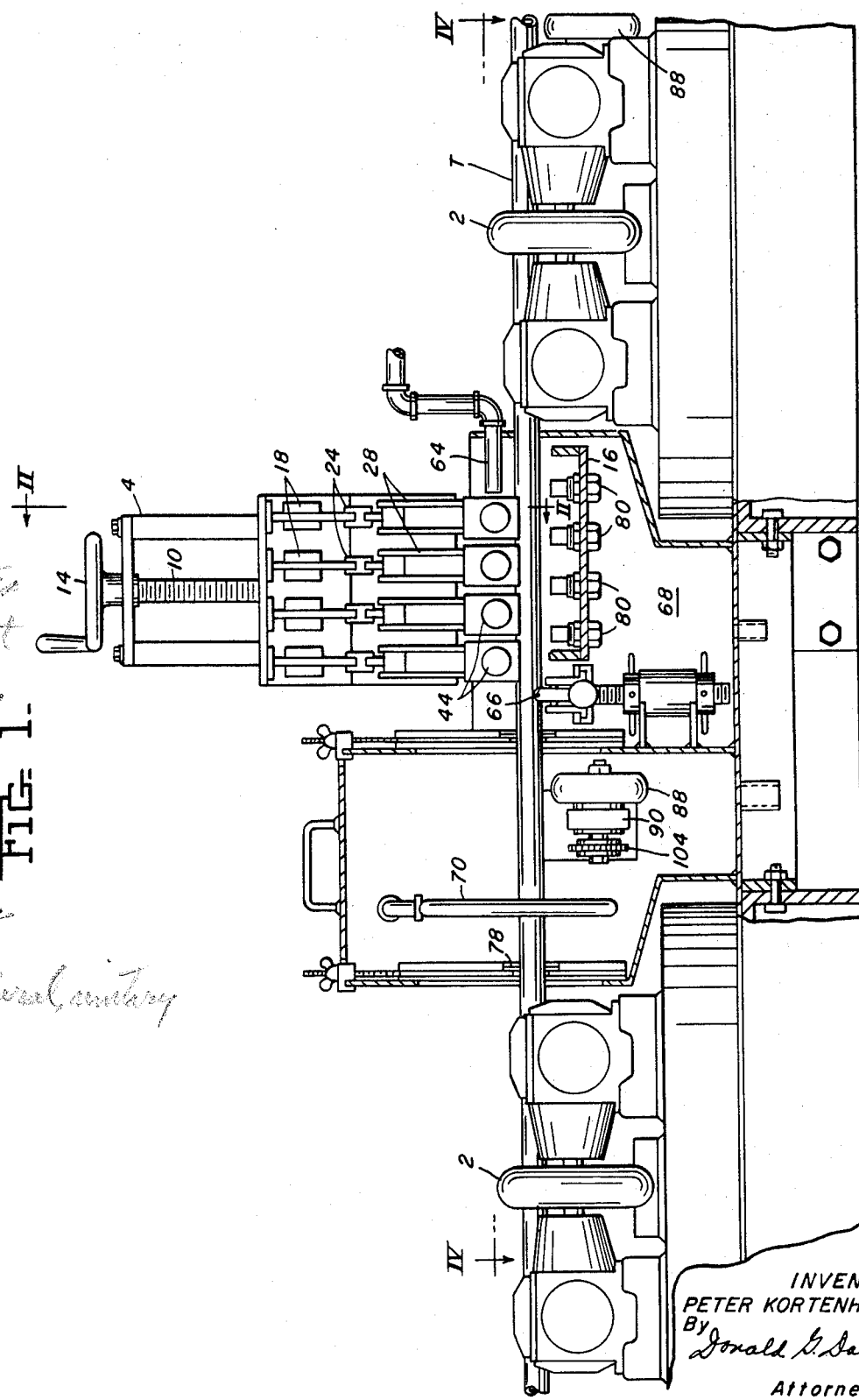

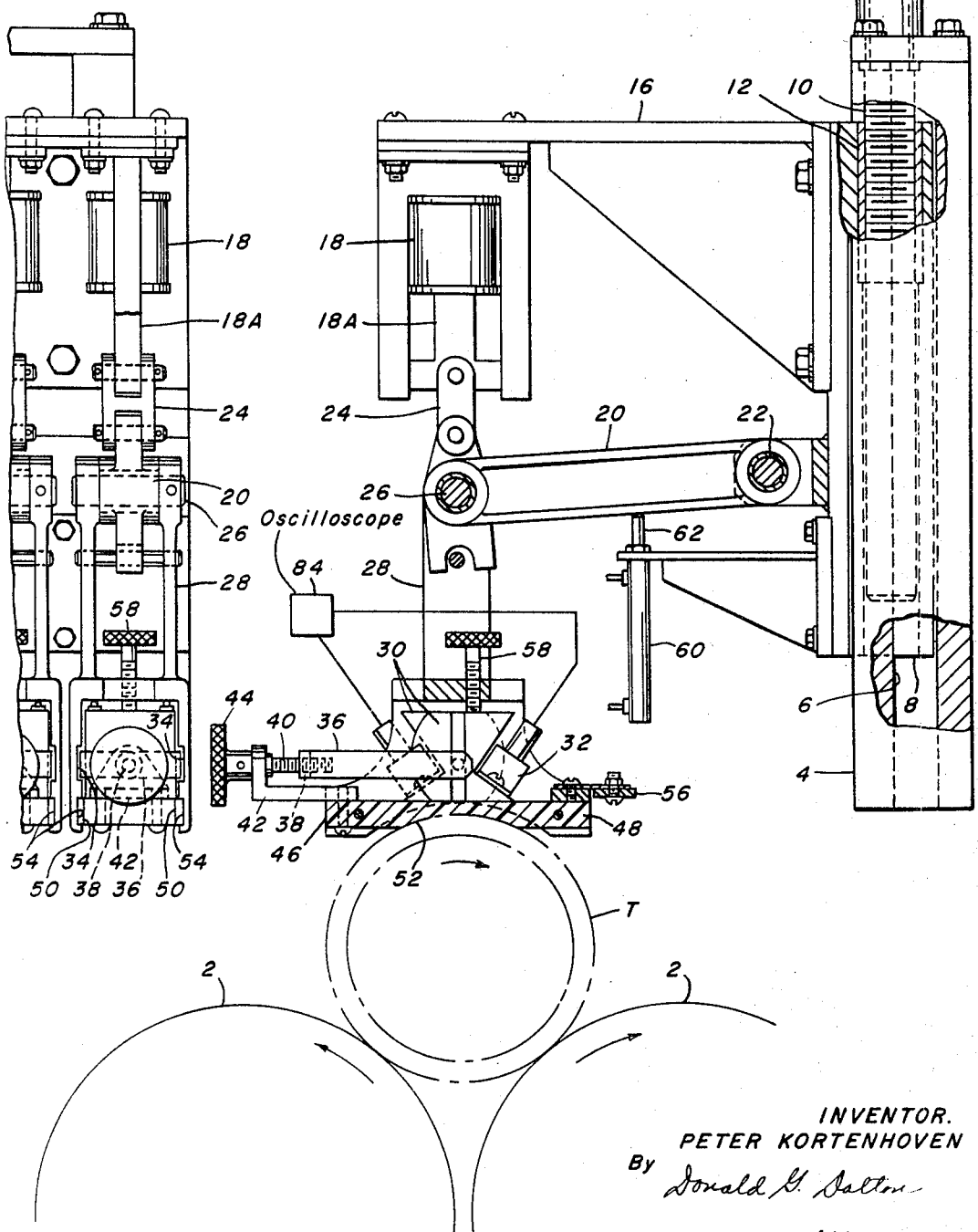

3,472,064
APPARATUS FOR ULTRASONICALLY TESTING TUBES
Peter Kortenhoven, Chicago, Ill., assignor to United States Steel Corporation, a corporation of Delaware
Filed May 29, 1967, Ser. No. 642,041
Int. Cl. G01n 9/24, 29/04
U.S. Cl. 73—67.8                              10 Claims

ABSTRACT OF THE DISCLOSURE

Apparatus for ultrasonically testing a longitudinally moving steel tube having a plurality of crystals arranged side by side with the tube passing under the crystals as it rotates about its axis. The crystals are arranged at an angle of 90° to the crystals adjacent thereto. The crystals are brought rapidly and successively into operative position as the leading end of the tube approaches each crystal. A special arrangement of the contact shoe for each crystal increase the life of the shoe. Supports are provided for a standard test tube to test the apparatus, the supports being permanent but readily moved between operative and inoperative positions.

---

This invention relates to apparatus for ultrasonically testing tubes and more particularly to testing steel tubes which are rotated as they move longitudinally. There are various ways of doing this at the present time. One way is the contact method in which the tube is held in a position against a contact shoe. Testers of this type, of which I have knowledge, have various disadvantages. The adjustment and preparation of the tester for testing various size tubes may be too slow or difficult, the contact shoe may be subjected to excessive wear, the control for sequential operation of a plurality of crystals arranged along the length of the tube to bring them into and out of operative position with the tube may be too slow and may be such that a substantial length of tube adjacent its end may not be tested, and/or continuous contact with the tube may not be maintained when the tube being tested is not perfectly straight.

It is therefore an object of my invention to provide ultrasonic testing apparatus which is readily adjustable for testing various size tubes.

Another object is to provide such apparatus which provides fast and accurate sequential operation of the crystals.

Still another object is to provide such apparatus which provides uniform and continuous contact of tube with the contact shoe.

These and other objects will be more apparent after referring to the following specification and attached drawings, in which:

FIGURE 1 is an elevation of the apparatus of my invention with parts broken away and shown in section;

FIGURE 2 is a view taken on the line II—II of FIGURE 1;

FIGURE 3 is a view looking toward the left of FIGURE 2;

FIGURE 4 is a view taken on the line IV—IV of FIGURE 1;

FIGURE 5 is a view taken on the line V—V of FIGURE 4; and

FIGURE 6 is a schematic wiring diagram.

Referring more particularly to the drawings, reference numeral 2 indicates spaced pairs of feed rolls which feed a tube T to and through the ultrasonic testing device of my invention. It will be understood that additional pairs of rolls 2 will be provided which feed the tube T rapidly longitudinally while causing it to rotate about its axis. Mounted between the pairs of rolls 2 is a vertical frame 4 having guides 6 therein. A slide 8 is mounted in the guides 6 for vertical movement. A screw 10 is secured in the top of frame 4 for rotation about its axis and is threaded into an internally threaded sleeve or nut 12 secured in the slide 8. A handwheel 14, attached to the top of screw 10, is rotated to cause the slide 8 to move vertically. A bracket 16 is attached to the slide 8 and at its outer end supports four solenoids 18, each having an armature 18A extending downwardly therefrom. Four arms 20 are pivotally mounted on slide 8 by means of pins 22. Pivotally mounted on the lower end of each armature 18A is a link 24, the lower end of which is pivotally secured to the associated arm 20. Pivotally mounted on each arm 20 by arms of a pin 26 is a hanger 28. The lower end of hanger 28 is U-shaped for receiving a crystal holder 30. The crystal holder 30 is made of a plastic, preferably Lucite, and has a crystal 32 secured thereto at an angle. The crystal on each holder 30 is arranged at an angle of 90° to the crystals adjacent thereto. The crystals 32 are standard, one suitable being that manufactured by Branson Instruments, Incorporated, Model No. Z103–G, 2.25 megacycle, Type MHZ, Stamford, Conn. Opposed grooves 34 are provided in the hanger 28 for receiving an arm 36 having its inner end attached to holder 30. The arm 36 has a threaded opening 38 in its outer end for receiving a screw 40 which is secured for rotation in an L-shaped bracket 42. A fitting 44 secured to the end of screw 40 prevents longitudinal movement thereof with respect to bracket 42. Thus, when the fitting 44 is turned, the crystal holder 30 is moved transversely to the pass line of tube T. The L-shaped bracket 42 is supported on a contact shoe 46 which consists of a plate 48 of the same material as crystal holder 30 located between two steel plates 50. The shoe 46 has a concave bottom surface 52 corresponding to the outer radius of the tube T being tested. The shoe 46 is slidably received in opposed slots 54 located at the lower end of hanger 28. A counterweight 56 may be provided on shoe 46 opposite bracket 42. The crystal holder 30 is held in its adjusted position by means of a set screw 58. An air cylinder 60 having a piston rod 62 is provided beneath each arm 20 with the piston rod 62 bearing against the bottom of the arm.

A liquid couplant is applied to the tube T, prior to its entry into the ultrasonic testing apparatus, by means of a tube 64. The couplant, in addition to serving as a conductor for the ultrasonic wave, must also function as a lubricant to reduce the wear between the shoe and tube. A pair of rolls 66 are provided on the exit end of the crystals to act as a support for the tube. The axis of the rolls 66 are parallel to the direction of travel of the tube. A sump 68 is located below the crystals 32 for receiving excess couplant liquid. A water spray 70 and wiper 78 are provided on the exit side of rolls 66 so as to remove coolant from the tube. The usual cleaning apparatus is provided on the entry side of crystals 32 to clean the tube prior to its entry into the ultrasonic testing equipment.

Located beneath each of the crystals 32, slightly on the entry side thereof, is a normally opened switch 80, which is closed by contact of the leading end of the tube being tested and which will open after the trailing end of the tube passes thereover. This may be a flag switch closed by contact of the tube 2, a magnetic switch closed by presence of the pipe or any other suitable proximity switch. Each switch 80 is connected to power source L1, L2 in series with a relay coil 82 having a normally closed contact 82C. Contact 82C is connected in series with the associated solenoid 18 to a power source L3, L4.

The crystals 32 are connected to an oscilloscope 84, such as that sold by Sperry under the trade name Reflectoscope.

Rotatively mounted at one side of the ultrasonic tester is a tube 86 having its axis parallel to the axis of the tube T being tested. Two pairs of rolls 88 are rotatively mounted on the end of arms 90 secured to the tube 86, the axes of rolls 88 being parallel to the axis of tube 86. A hydraulic cylinder 92 has its piston rod 92R pivotally connected to an arm 94 which is secured to tube 86 so that movement of the piston rod 92R will cause movement of the rolls 88 in a generally vertical direction. The rolls 88 are driven from sprockets 96 secured to a shaft 98 which passes through tube 86 and is rotated by a variable speed motor 100. Chains 102, driven by sprockets 96, pass around sprockets 104 secured to the shafts of one of the rolls 88 in each pair.

The operation of the tester is as follows:

A shoe 46 having the desired size of groove 52 for the size of the tubes to be tested is positioned in the slots 54 and the crystal holders 30 are positioned in the center position shown after which the set screws 58 are tightened. At this time rolls 88 will be located below the pass line of the tube T and the solenoids 18 will be energized so that the hangers 28 are in an elevated position. The cylinders 60 act as counterweights so that excess pressure of the shoes 46 on the tube T being tested will not occur. As the tube T is fed forwardly by means of rolls 2, its leading end will successively actuate the switches 80 associated with each crystal 32. This successively closes the switches 80 to energize relay coils 82, thus opening contact 82C and deenergizing solenoids 18. Thus, the weight of the hanger 28 and parts associated therewith cause the shoes 46 to contact the surface of the tube T and ultrasonic testing will proceed in the customary manner. As the end of the tube T being tested passes successively from each switch 80, it will open so as to energize the associated solenoid 18. The apparatus is then ready to test a succeeding tube.

When it is desired to test a tube of a different size, it is only necessary to release the set screws 58 and slide the shoe 46 from the slots 54 after which a shoe 46 of the desired size is repositioned as described above. I have found that the Lucite plates 48 will wear faster than the steel plates 50 so that eventually they will not directly contact the surface of the tube being tested. However, the couplant liquid will flow into the recess formed between the plates 50 and maintain a good coupling between the tube T and crystal 32. Prior to my invention, it was thought necessary to contact the tube with the full surface of a plastic shoe and this caused excessive wear and resulted in a short life. With the present shoe a much longer life is obtained.

It is also necessary to calibrate the tester periodically by means of a test tube having a known defect therein. Prior to my invention, it was difficult to accomplish this so that the tester was out of operation for a relatively long time. According to the present invention, it is only necessary to provide fluids at the top of cylinder 92, thus causing the rolls 88 to raise to a position where the test tube can be positioned thereon in contact with the shoes 46. Rotation of the motor 100 will then cause the test tube to rotate about its axis being without longitudinal movement, thus permitting proper testing of the equipment. After the testing is completed, it is only necessary to lower the rolls 88 below the pass line and the equipment is then ready for testing additional tubes.

I claim:

1. Apparatus for ultrasonically testing a longitudinally moving tube comprising a plurality of crystals arranged side by side longitudinally of the path of travel of the tube, means for moving the tube past the crystals while at the same time rotating it about its axis, each crystal being arranged at an angle to the crystals adjacent thereto, means for automatically bringing the crystals successively into operative position as the leading end of the tube approaches each crystal, and means connected to said crystals for detecting a flaw in said tube.

2. Apparatus according to claim 1 including a holder for each crystal located above the path of tube travel, and a contact shoe mounted on each crystal holder, said contact shoe including a relatively soft plastic plate having a curved surface adjacent the tube and a relatively hard plate on each side of said relatively soft plastic plate having similarly curved surface adjacent the tube, the curved surfaces of said hard plates extending downwardly at least as far as that of said soft plate.

3. Apparatus according to claim 2 in which the means for automatically bringing the crystals successively into operative position includes a movable hanger for each crystal holder, a solenoid for raising and lowering said hanger, and a switch operable by the leading end of a tube for operating said solenoid to lower said movable hanger and operable by the trailing end of said tube to raise said movable hanger.

4. Apparatus according to claim 3 including means for controlling the force exerted by said contact shoe on said tube.

5. Apparatus according to claim 2 including means for controlling the force exerted by said contact shoe on said tube.

6. Apparatus according to claim 2 including means for applying a liquid couplant to said tube before it reaches said crystals, said couplant being a conductor for ultrasonic waves and a friction reducing lubricant.

7. Apparatus according to claim 2 including retractable means for supporting and rotating a test tube beneath said crystals.

8. Apparatus according to claim 3 including means for applying a liquid couplant to said tube before it reaches said crystals, said couplant being a conductor for ultrasonic waves and a friction reducing lubricant.

9. Apparatus according to claim 8 including means for controlling the force exerted by said contact shoe on said tube.

10. Apparatus according to claim 9 including retractable means for supporting and rotating a test tube beneath said crystals.

References Cited

UNITED STATES PATENTS

| 3,327,523 | 6/1967 | Kelemencky et al. | 73—71.5 |
| 3,371,524 | 3/1968 | Wloszek | 73—67.8 |
| 3,375,706 | 4/1968 | Pandelis et al | 73—67.9 |
| 3,416,364 | 12/1968 | Wycherley et al. | 73—67.8 |

RICHARD C. QUEISSER, Primary Examiner

J. P. BEAUCHAMP, Assistant Examiner

U.S. Cl. X.R.

310—8.7